United States Patent [19]

Tsujikawa et al.

[11] 3,946,217

[45] Mar. 23, 1976

[54] ELECTRONIC CASH REGISTER CAPABLE OF CALCULATING SALES TAX

[75] Inventors: Atsushi Tsujikawa; Yoshio Morimoto, both of Kyoto, Japan

[73] Assignee: Omron Tateisi Electronics Co., Japan

[22] Filed: July 26, 1974

[21] Appl. No.: 492,282

[30] Foreign Application Priority Data
June 13, 1974  Japan.................................. 49-67454

[52] U.S. Cl................................. 235/156; 235/168
[51] Int. Cl.²......................................... G06F 7/48
[58] Field of Search ........... 235/156, 159, 160, 164, 235/168

[56] References Cited
UNITED STATES PATENTS

| | | | |
|---|---|---|---|
| 3,253,132 | 5/1966 | Pendleton............................ | 235/168 |
| 3,281,794 | 10/1966 | Townsend........................ | 235/160 X |
| 3,294,960 | 12/1966 | Townsend........................ | 235/156 X |
| 3,330,947 | 7/1967 | Alpert et al...................... | 235/160 X |
| 3,598,973 | 8/1971 | Brooks et al..................... | 235/156 X |

*Primary Examiner*—Joseph F. Ruggiero
*Assistant Examiner*—Jerry Smith
*Attorney, Agent, or Firm*—Staas & Halsey

[57] ABSTRACT

A system and method for calculating a sales tax imposed upon a total amount of sales based on a predetermined sales tax collection schedule in an electronic cash register, which schedule comprises a series of the imposable tax values and the corresponding ranges of the taxable sales amounts, a first portion of which comprises a pattern of widths of successive said ranges in for the successively increasing, respectively corresponding tax values which does not occur again in the remainder of the schedule and a second portion of which comprises a pattern of widths of successive said ranges for successively increasing, respectively corresponding tax values which pattern repeats in a regular fashion while the tax value becomes higher. The first and second patterns of width are in advance stored in a storage of said electronic cash register; a usual registering operation is carried out to provide a taxable total amount of sales; an arithmetic operation is carried out to deduct the largest possible integral number of full cycles of the taxable amount of the repeated pattern in said second portion from the taxable total amount of sales; the stored schedule of said first and second portions is indexed for determining a first imposable tax corresponding to said total amount of sales, as deducted; a second corresponding sales tax imposable upon said deducted integral number of full cycles of taxable amount of sales is obtained by multiplication of a full cycle of the imposable tax amount of the repeated pattern in said second portion by said integral number; and the imposable total amount of sales tax is obtained by addition of said first and second tax amounts thus obtained.

23 Claims, 4 Drawing Figures

ELECTRONIC CASH REGISTER CAPABLE OF CALCULATING SALES TAX

BACKGROUND OF THE INVENTION

1. Field of the Invention

The present invention relates to an electronic cash register capable of calculating a sales tax. More specifically, the present invention relates to an improved system and method for calculating a sales tax imposed upon the total amount of sales based on a predetermined sales tax collection schedule, in an electronic cash register.

2. Description of the Prior Art

In certain countries such as the United States a retail sales tax is imposed upon the total amount of retail sales, based on a predetermined retail sales tax collection schedule. It is desired to provide a electronic cash register that can calculate the sales tax as well as a total amount of sales upon entering various data therein such as a commodity code, a unit price, the number of the commodities, etc.

For that purpose those skilled in the art might think of an electronic cash register capable of calculating the sales tax based on a predetermined sales tax collection schedule, as comprising a pin board and an operating circuit provided, in addition to a common electronic cash register, for the purpose of selectively setting the said predetermined collection schedule and calculating the sales tax, respectively, in accordance with the entered data and the set data. Usually the pin board is provided independently of the cash register and is adapted for storing various data necessary for calculating the sales tax and there also is provided an information entering or setting means for such data.

FIG. 1 illustrates a block diagram of such an exemplary electronic cash register capable of calculating the sales tax. Basically, the cash register shown comprises a keying input means 1, a data processing unit 2, a storage 3, a printer 4 and a display 5. The cash register further comprises an additional storage 7 such as a pin board as mentioned above and an information setting means 6 for the storage 7, which are provided for the purpose of storing the data necessary for calculating the sales tax based on the predetermined sales tax collection schedule.

In operation of the FIG. 1 system, the full data associated with the said predetermined sales tax collection schedule necessary for calculating the sales tax is entered in advance through the setting means 6 to the storage 7. In a common registering operation for various commodities, various data such as a commodity code, a unit price, the number of the commodities, etc. are registered, i.e., entered, through the keying input means 1 so that such data are stored in the storage 3. Then the data processing unit 2 makes various arithmetic operations thereon based on the data stored in the storage 3. The results of the operation including a total of the sales are printed out by the printer 4 and displayed by the display 5. The data processing unit 2 performs a further arithmetic operation to calculate the sales tax to be imposed upon the total amount of sales, based on the said total amount of sales and with reference to the data stored in the storage 7. The sales tax as thus calculated is also printed out by the printer 4 and displayed by the display 5.

One problem encountered in connection with the abovementioned exemplary electronic cash register is that it is necessary to provide an additional storage 7 such as a pin board, independently of a common electronic cash register, for the purpose of storing full information concerning the sales tax collection schedule, which requires a relatively large capacity of storage and thus increases the cost of the electronic cash register. Another problem encountered in the abovementioned register is that full information concerning the sales tax collection schedule must be entered or set for each electronic cash register, which is tiresome and time consuming. This is aggravated by the fact that particularly in the United States the sales tax collection schedule is different from state to state.

Thus it would be desirable if there would be provided an improved system and method for calculating the sales tax imposed upon the total amount of sales based on a predetermined sales tax collection schedule in an electronic cash register wherein the operation of setting, or entering the information or data concerning the sales tax collection schedule is simplified.

SUMMARY OF THE INVENTION

In accordance with the present invention, any retail sales tax collection schedule which comprises a series of tax values applicable to respectively corresponding ranges of taxable sales amounts is analyzed to discern a first portion, if any, in which a pattern of the widths of the said ranges for a succession of respectively corresponding tax values does not occur again in any other portion of the schedule, and a second portion in which such a pattern of widths of the ranges for a succession of respectively corresponding tax values is repeated in a regular fashion for increasing tax values.

One aspect of the present invention is to provide an electronic cash register for a registering a total amount of sales and for calculating the sales tax imposed upon that total amount of sales in accordance with the applicable sales tax collection schedule. The register comprises means for selecting an operation mode of the selectable cash register, said operation modes comprising a tax schedule information entry mode and a registering operation mode. Storage means, in said schedule entry mode has written thereinto, in advance, said first, if any, and second patterns of widths of ranges through keying input means and operation means, in said registering mode, calculates said total amount of sales and said sales tax imposed upon said total amount of sales based on said sales tax collection schedule.

Another aspect of the present invention is to provide a system and method for calculating a sales tax imposed upon a total amount of sales based on a predetermined sales tax collection schedule in an electronic cash register wherein first, if any, and second patterns of widths of ranges are in advance stored in a storage of said electronic cash register; a usual registering operation is carried out to provide said taxable total amount of sales; an arithmetic operation is carried out to deduct the largest possible integral number of full cycles of the taxable amount of a repeated pattern in said second portion of the schedule from said taxable total amount of sales; the stored schedule of said first, if any, and second portions is indexed for determining a first imposable tax corresponding to that part of the total amount of sales remaining after the deduction, and a second corresponding sales tax imposable upon said deducted integral number of full cycles of the taxable amount of sales, the latter being obtained by multiplication of a full cycle of the imposable tax amount of the repeated pattern in said second portion by said integral number; and, finally, the imposable total amount of sales tax is obtained by addition of said first and second tax amounts thus obtained.

Accordingly, a primary object of the present invention is to provide an improved system and method for calculating a sales tax imposed upon the total amount of sales based on a predetermined sales tax collection schedule in an electronic cash register, wherein setting or entering of information or data concerning the sales tax collection schedule is simplified.

Another object of the present invention is to provide an electronic cash register for performing a registering operation for providing a total amount of sales and for calculating a sales tax imposed upon said total amuont of sales based on a predetermined sales tax collection schedule, wherein the storage of the information or data concerning the sales tax collection schedule is simplified.

These objects, and other objects and features of the present invention will be better understood when taken in conjunction with the following detailed description made with reference to the accompanying drawings.

DESCRIPTION OF THE PREFERRED EMBODIMENTS

Figure 1:
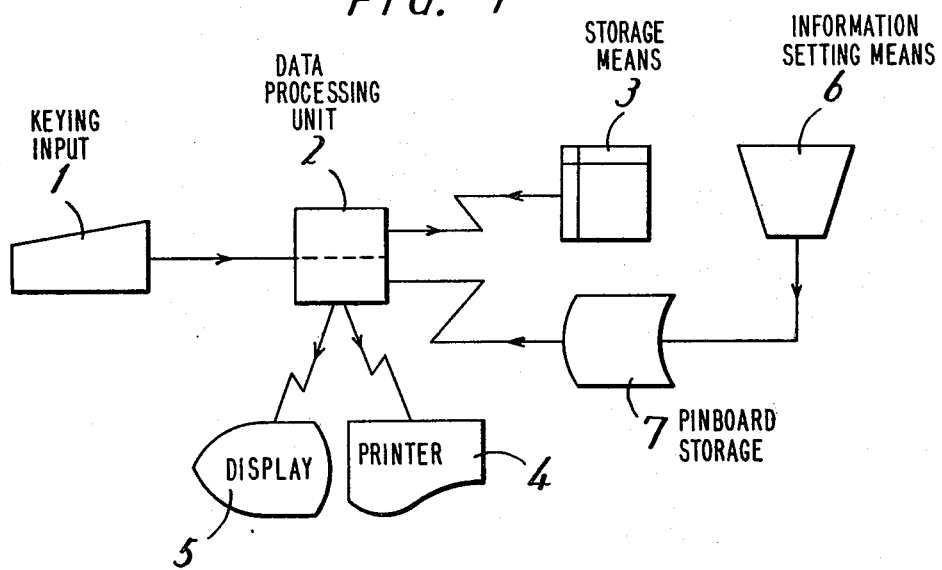
FIG. 1 illustrates a block diagram of an exemplary electronic cash register capable of calculating the sales tax.

Before entering into a detailed description of the embodiments of the present invention, it would be appropriate to consider in detail several sales tax collection schedules out of those now adopted individually in the respective states in the United States. The reason is that, as mentioned previously, in the United States each state adopts individually a unique and different sales tax collection schedule for the purpose of imposing a sales tax upon the sales and this fact makes it difficult to input or set the data associated with the collection schedule in a storage of the electronic cash register.

Tables 1, 2 and 3 show Retail Sales Tax Collection Schedules now adopted in the states of Oklahoma, Washington and Georgia, respectively. In each of these Tables, the right column indicates a series of different values of the retail sales tax to be imposed listed in an increasing order at intervals of one cent, while the left and middle columns indicate a range of the retail sales upon which the tax of the corresponding row is imposed each successive range corresponds to a unit increase of one cent, the left column indicating the lower limit of the range and the middle column indicating the upper limit of the range. With particular reference to Table 1, for example, no retail sales tax is imposed upon an amount of retail sales from zero to fourteen cents and a retail sales tax of one cent is imposed upon an amount of retail sales from 15 to 39 cents. Similar lists are also seen in Tables 2 and 3.

For the purpose of calculating the retail sales tax, an appropriate retail sales tax collection schedule is set or entered into an electronic cash register such that the register can calculate the retail sales tax based on the schedule of the state where the register is used. As discussed in the section of Description of the Prior Art, such entering or setting of full information of one schedule is tiresome and time consuming and requires a large capacity of storage.

TABLE 1

STATE OF OKLAHOMA

RETAIL SALES TAX COLLECTION SCHEDULE

| SALES TAXABLE | | |
|---|---|---|
| LOWER LIMIT | UPPER LIMIT | TAX IMPOSABLE |
| .00 | .14 | .00 |
| .15 | .39 | .01 |
| .40 | .64 | .02 |
| .65 | .89 | .03 |
| .90 | 1.14 | .04 |
| 1.15 | .39 | .05 |
| .40 | .64 | .06 |
| .65 | .89 | .07 |
| .90 | 2.14 | .08 |
| 2.15 | .39 | .09 |
| .40 | .64 | .10 |
| .65 | .89 | .11 |
| .90 | 3.14 | .12 |
| 3.15 | .39 | .13 |
| .40 | .64 | .14 |
| .65 | .89 | .15 |
| .90 | 4.14 | .16 |
| 4.15 | .39 | .17 |
| .40 | .64 | .18 |
| .65 | .89 | .19 |
| .90 | 5.14 | .20 |
| 5.15 | .39 | .21 |
| .40 | .64 | .22 |
| .65 | .89 | .23 |
| .90 | 6.14 | .24 |
| 6.15 | .39 | .25 |

TABLE 2

STATE OF WASHINGTON

RETAIL SALES TAX COLLECTION SCHEDULE

| SALES TAXABLE | | |
|---|---|---|
| LOWER LIMIT | UPPER LIMIT | TAX IMPOSABLE |
| .00 | .10 | .00 |
| .11 | .24 | .01 |
| .25 | .45 | .02 |
| .46 | .64 | .03 |
| .65 | .83 | .04 |
| .84 | 1.02 | .05 |
| 1.03 | .21 | .06 |
| .22 | .40 | .07 |
| .41 | .59 | .08 |
| .60 | .78 | .09 |
| .79 | .97 | .10 |
| .98 | 2.16 | .11 |
| 2.17 | .35 | .12 |
| .36 | .54 | .13 |
| .55 | .73 | .14 |
| .74 | .92 | .15 |
| .93 | 3.11 | .16 |
| 3.12 | .30 | .17 |
| .31 | .49 | .18 |
| .50 | .67 | .19 |
| .68 | .86 | .20 |
| .87 | 4.05 | .21 |
| 4.06 | .24 | .22 |
| .25 | .43 | .23 |
| .44 | .62 | .24 |
| .63 | .81 | .25 |

TABLE 2-continued

STATE OF WASHINGTON
RETAIL SALES TAX COLLECTION SCHEDULE

| SALES TAXABLE | | |
|---|---|---|
| LOWER LIMIT | UPPER LIMIT | TAX IMPOSABLE |
| .82 | 5.00 | .26 |
| 5.01 | .18 | .27 |
| .19 | .37 | .28 |
| .38 | .56 | .29 |
| .57 | .75 | .30 |
| .76 | .94 | .31 |
| .95 | 6.13 | .32 |
| 6.14 | .32 | .33 |
| .33 | .50 | .34 |
| .51 | .69 | .35 |
| .70 | .88 | .36 |
| .89 | 7.07 | .37 |
| 7.08 | .26 | .38 |
| .27 | .45 | .39 |

TABLE 3

STATE OF OKLAHOMA
RETAIL SALES TAX COLLECTION SCHEDULE

| SALES TAXABLE | | |
|---|---|---|
| LOWER LIMIT | UPPER LIMIT | TAX IMPOSABLE |
| .00 | .10 | .00 |
| .11 | .35 | .01 |
| .36 | .66 | .03 |
| .67 | 1.10 | .04 |
| 1.11 | .35 | .05 |
| .36 | .66 | .07 |
| .67 | 2.10 | .08 |
| 2.11 | .35 | .09 |
| .36 | .66 | .11 |
| .67 | 3.10 | .12 |
| 3.11 | .35 | .13 |
| .36 | .66 | .15 |
| .67 | 4.10 | .16 |
| 4.11 | .35 | .17 |
| .36 | .66 | .19 |
| .67 | 5.10 | .20 |
| 5.11 | .35 | .21 |
| .36 | .66 | .23 |
| .67 | 6.10 | .24 |
| 6.11 | .35 | .25 |

In an attempt to simplify the entering or setting of such information concerning the retail sales tax collection schedule, the present inventors made the following detailed analysis of all of the sales tax collection schedules now adopted in various states in the United States. As a result it was observed that every sales tax collection schedule now adopted in the United States comprises a first portion encompassing a first set of rows, referred to as Part A hereinafter, in which there exists a pattern of widths of the ranges, the difference between the lower and upper limits, for each of successive ranges and thus for each of successive rows and corresponding tax values, which is unique or exceptional and never occur again in any other portion of the schedule, and a second portion or a second set of rows, referred to as Part B hereinafter, in which there exists a pattern of widths of the ranges for successive rows and corresponding tax values, which is repeated in a regular fashion while the rows proceed toward higher values of sales tax.

Table 4 shows a symbolized retail sales tax collection schedule adopted in the United States in which various symbols are adapted for facilitating an explanation of the abovementioned Parts A and B. Referring to Table 4, a pattern of increase of the upper limit value, i.e., the value in the middle column in each row throughout the Part A and thus the pattern of the values $A_1$ to $A_m$, is not repeated again in any other portion of the schedule, while a pattern of increase of the upper limit value, i.e., the value in the middle column in each row throughout the Part B and thus the pattern of the values $B_1$ to $B_M$, is repeated again and again as the rows proceed toward higher values of the tax. Namely, there are relations,

TABLE 4

GENERAL SYMBOLIZED RETAIL SALES TAX COLLECTION SCHEDULE

| SALES TAXABLE | | |
|---|---|---|
| LOWER LIMIT | UPPER LIMIT | TAX IMPOSABLE |
| $A_0$ | $A_1$ | $X_{A0}$ |
| $A_2$ | $A_3$ | $X_{A1}$ |
| $A_4$ | $A_5$ | $X_{A2}$ |
| $A_{m-3}$ | $A_{m-2}$ | $X_{Am-1}$ |
| $A_{m-1}$ | $A_m$ | $X_{Am}$ |
| $B_0$ | $B_1$ | $X_{B0}$ |
| $B_2$ | $B_3$ | $X_{B1}$ |
| $B_4$ | $B_5$ | $X_{B2}$ |
| $B_6$ | $B_7$ | $X_{B3}$ |
| $B_8$ | $B_9$ | $X_{B4}$ |
| $B_{10}$ | $B_{11}$ | $X_{B5}$ |
| $B_{12}$ | $B_{13}$ | $X_{B6}$ |
| $B_{M-3}$ | $B_{M-2}$ | $X_{BM-1}$ |
| $B_{M-1}$ | $B_M$ | $X_{BM}$ |
| $B_{M+1}$ | $B_{M+2}$ | $X_{BM+1}$ |
| $B_{m+3}$ | $B_{m+4}$ | $X_{BM+2}$ |
| $B_{M+5}$ | $B_{M+6}$ | $X_{BM+3}$ |
| $B_{M+7}$ | $B_{M+8}$ | $X_{BM+4}$ |
| $B_{M+9}$ | $B_{M+10}$ | $X_{BM+5}$ |
| $B_{M+11}$ | $B_{M+12}$ | $X_{BM+6}$ |

$B_1 - A_m = B_{M+2} - B_M$, $B_3 - B_1 = B_{M+4} - B_{M+2}$, $B_5 - B_3 = B_{M+6} - B_{M+4}$, ..., $B_{2n+1} - B_{2n-1} = B_{M+2(n+1)} - B_{M+2n}$, ... It is understood that Part B is repeated throughout the schedule at an interval of $(M + 1)/2$ rows. In observing the schedule of Table 2 in accordance with a generalized expression in Table 4, the difference between the upper limit values in the first and second rows is 14, the difference between the upper limits values in the second and third rows is 21, and the difference between the upper limits values in any other two adjacent rows, up to the row having an upper limit value of 3 dollars and 30 cents, is nineteen. This pattern of the difference between the upper limit values of adjacent rows is not repeated any more in the schedule of Table 2. Thus in Table 2 Part A comprises that portion of the schedule starting from the first row and ending at the row having an upper limit value of three dollars and thirty cents, at which row the tax imposable is 17 cents. In closely observing the schedule of Table 2, in a portion of the schedule starting from the row having an upper limit value of 3 dollars and 49 cents and ending at the row having an upper limit value of six dollars and 13 cents, a difference of eighteen exists both between the upper limit value in the row of three dollars and forty-nine cents and the higher adjacent row, and also between the upper limit value in the row of five dollars and the higher adjacent row while the difference between the upper limit values of any other two adjacent, i.e., successive, rows is nineteen. In all rows of higher upper limit values, the pattern of the last mentioned portion is repeated as the rows proceed. Thus it is understood that in Table 2 the last mentioned portion corresponds to Part B.

In summarizing, let it be assumed that $$a_n = A_{n+2} - A_n \ (n = 0, 1, ) \qquad (1)$$

$$B_n = B_{n+1} - B_{n-1} \quad (n = 0, 1, \ldots) \tag{2}$$

$$A_m = B - 1$$

then, the upper limit value in any row exceeding $B_M$ is expressed as follows, $$B_{M+2n} = B_M + t(B_M - A_m) + (b_0 + b_2 \quad +b_{2l})$$
$$= B_M + t(B_M - A_m) + \sum_0^l b_{2k} \tag{3}$$

where $n = 0, 1, .$ $t = 0, 1, \ldots$ $$l = n \frac{t(M+1)}{2} - 1 \quad \left( l \leq \frac{M-1}{2} \right)$$

From the above discussed analysis, it is understood that it is only necessary to store a certain limited amount of information concerning Parts A and B, such as the upper limit values in Parts A and B, in an electronic cash register by way of an initial setting data. This then can enable calculation of the tax to be imposed, based on the taxable sales amount calculated in the register and the data stored as mentioned above, by means of rather simplified hardware or software. It is pointed out that the present invention was accomplished based on the abovementioned analysis.

Figure 2:
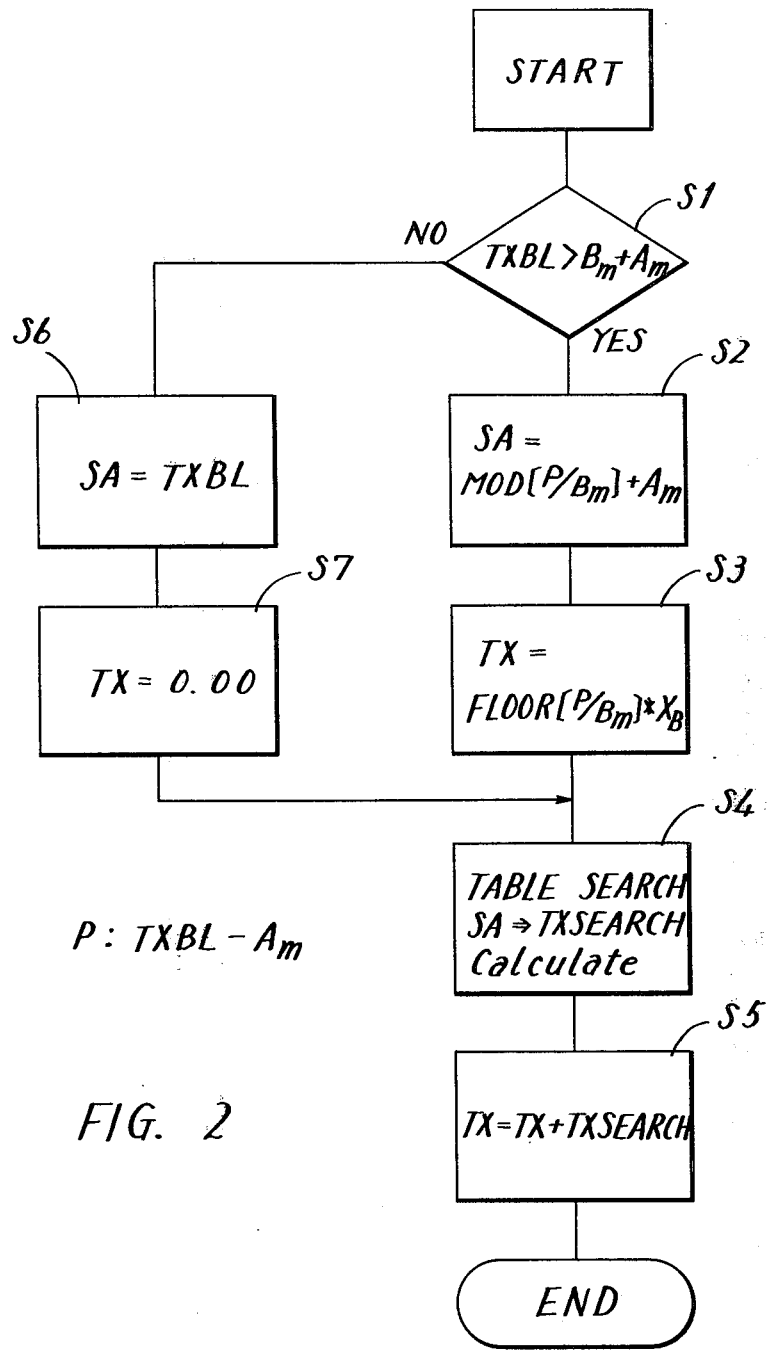
FIG. 2 illustrates a flow chart showing a basic concept of the inventive method of calculating the sales tax to be imposed upon the taxable sales amount based upon a predetermined sales tax collection schedule in an electronic cash register.

FIG. 2 illustrates a flow chart showing a basic concept of the inventive method of calculating the sales tax to be imposed upon a taxable sales amount based upon a predetermined sales tax collection schedule, in an electronic cash register. For the purpose of executing the operation shown, an electronic cash register combined with a small sized computer is prepared, as is more fully described subsequently.

The first step of the operation comprises the step S1 of comparing the taxable amount of retail sales, simply referred to as TXBL, with the highest upper limit value $B_M$ in the first cycle of Part B to check whether the taxable amount of sales (TXBL) exceeds the highest upper limit value $B_M$ in the first cycle of Part B. Since Part B is repeated in the higher portion of the schedule, as described previously, it is understood that a full cycle of the repeated pattern of the upper limit values in Part B, $B_m$, may be expressed as $B_m = B_M - A_m$.

First let it be assumed that the taxable amount of retail sales exceeds the highest upper limit value in the first cycle of Part B, $B_M = B_m + A_m$, or TXBL$>B_m + A_m$, then the next step S2 comprises the step of calculating a sum of the highest upper limit value in Part A, $A_m$, and a remainder resulting from division, by the said value of full cycle $B_m$ of the taxable amount, of a quantity comprising the said retail sales TXBL subtracted by the highest upper limit value in Part A, $A_m$. The step S2 may be expressed as $S_A = \text{MOD}(\text{TXBL} - A_m/B_m) + A_m$ in accordance with the high level computer language of PL 1. It is understood that the result of step 2 is the remainder after subtraction of the largest possible integral number of full cycles of Part B, $B_m$, from the taxable amount of retail sales TXBL, where the taxable amount of retail sales includes an integral number of full cycles of Part B, $B_m$.

The third step S3 comprises the step of multiplication of the full cycle of imposable tax in Part B, $X_B$, by the said largest possible integral number of full cycles of Part B, that largest possible integral number being obtained as a result of the said division, by the said value of full cycle $B_m$, of the said quantity comprising the taxable amount of retail sales TXBL less the highest upper limit value in part A, $A_m$. The step S3 may be expressed as $T_X = \text{FLOOR}(\text{TXBL} - A_m/B_m)*X_B$ in accordance with the computer language of PL 1.

The fourth step S4 comprises a search of Table 4 to determine to which row the value of $S_A$ corresponds, and calculation of the corresponding imposable tax TXSEARCH based on the row of the Table 4 schedule as determined by the search.

The next step S5 is to calculate a sum of the value $T_X$ at the step S3 and the value TXSEARCH at the step S4, which sum is the imposable retail sales tax to be imposed upon the total amount of retail sales.

Next let it be assumed that the taxable amount of retail sales does not exceed the highest upper limit value in the first cycle of Part B, $B_M$, or TXBL $\leq B_m + A_m$, then in the steps S6 and S7, a setting is made of $S_A = $ TXBL and $T_X = 0.00$, respectively, and in the step S4 the value TXSEARCH is searched, which is the imposable retail sales tax, itself, in the assumed instance. The imposable retail sales tax thus obtained is supplied as the output by any suitable means such as a printer or a display.

Figure 3:
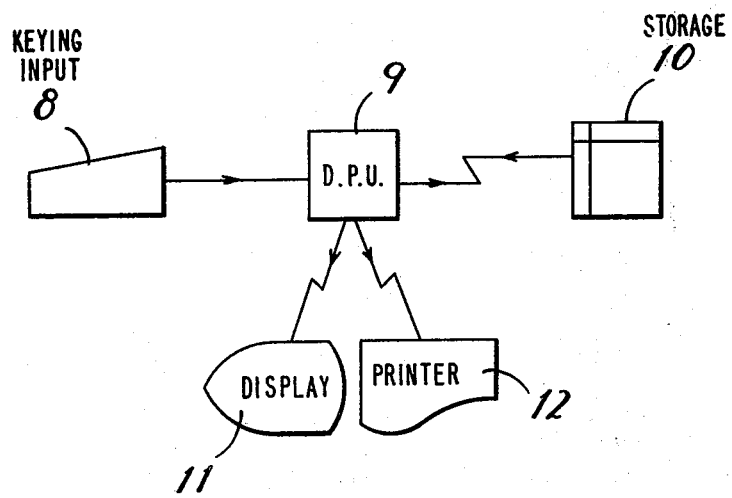
FIG. 3 illustrates a block diagram of an exemplary electronic cash register combined with a rather small sized computer capable of executing the FIG. 2 flow chart.

The operation in accordance with the flow chart shown in FIG. 2 can be executed by a typical electronic cash register combined with a rather small sized computer programmed for that purpose. FIG. 3 illustrates a block diagram of such an exemplary electronic cash register. The register shown comprises a keying input means 8, a data processing unit 9, a storage 10, a display 11 and a printer 12. It is pointed out that the storage 10 and unit 9 have a capacity of storing information concerning the Parts A and B of the Table 4 schedule and executing the abovementioned operation, in addition to the capacity thereof for performing the usual registering operations of a cash register.

In a usual registering operation, various data such as a commodity code, a unit price, the number of the commodities, etc are made input through the keying input means 8 and stored in the storage 10 and the registering operation is carried out by the unit 9. As a result the taxable total amount of retail sales TXBL is obtained as usual. The information concerning the Parts A and B of the Table 4 schedule and a program for execution of the FIG. 2 operation are entered in advance in the storage 10. Subsequently, therefore, the imposable tax for the said taxable retail sales total TXBL is calculated in the unit 9, based on the retail sales TXBL and the information concerning Parts A and B of the Table 4 schedule and in accordance with the program stored in the storage 10. The imposable retail sales tax as calculated as well as the result of the register operations is displayed by the display 11 and printed out by the printer 12.

Figure 4:
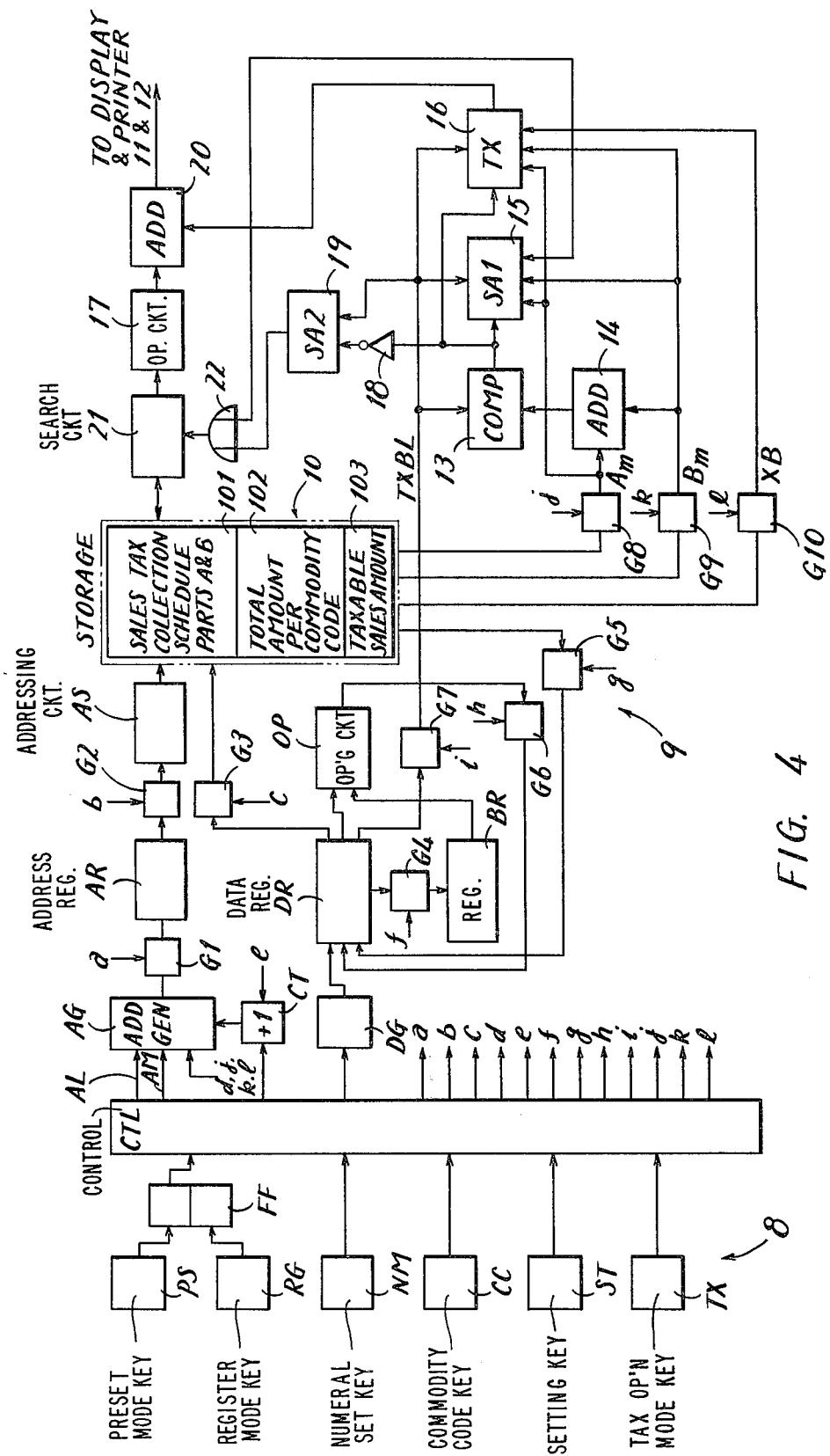
FIG. 4 illustrates a block diagram of an electronic cash register having an additional hardware specially designed for the purpose of executing the FIG. 2 flow chart.

The operation in accordance with the flow chart shown in FIG. 2 can also be executed by an electronic cash register having additional hardware specially designed for that purpose. FIG. 4 illustrates a block diagram of such an electronic cash register. In the FIG. 4 system, portions similar to those in the FIG. 3 system are designated by the same reference characters.

For the purpose of writing or loading in advance the information concerning Parts A and B of the Table 4 schedule, a preset mode key PS is depressed, so that a flip-flop FF is set to keep a control CTL enabled in a preset mode. Then a signal is obtained at a line AL to enable an address generator AG to generate an initial address in an area 101 for storing the upper limit value of the Table 4 schedule, as adopted in the state where the present electronic cash register is to be used. Upon depression of a setting key ST, a control signal a is obtained from the control CTL to enable a gate G1 so that the generated address is loaded in an address register AR. A further control signal b is then produced to enable a gate G2 so that the address signal loaded in the register AR enables an addressing circuit AS to address a location where the data of the first row of the schedule is to be stored. In such a situation the upper limit value of the first row of the Table 4 schedule is inputted by means of a set of numeral keys NM. The control CTL enables a data generator DG in response to the entered, upper limit value of the schedule to generate corresponding data in a format suitable for processing in the system shown. The data thus generated is loaded in a data register DR. Then a control signal c is produced by CTL to enable a gate G3, so that the data loaded in the register DR is written in the location of the area 101 which is addressed by the addressing circuit AS in accordance with the address signal loaded in the register AR. Then a control signal e is produced by the control CTL to enable a counter CT to step up by one the address generated by the address generator AG. Accordingly, upon depression of the setting key ST again, an address signal as stepped up by one is loaded in the address register AR in response to the control signal a and the addressing circuit AS addresses a location of one step higher address. In such a situation the upper limit value of the second row of the Table 4 schedule again is entered by means of the set of numeral keys NM, so that the value is written in a new location. Thereafter, similar operations are repeated until all the upper limit values listed in Parts A and B in the Table 4 schedule are written in the storage 10.

In the present embodiment of the invention, a few extra values such as the full cycle of the repeated pattern of the upper limit values in Part B, $B_m$ and the full cycle of imposable tax in Part B, $X_B$ are preferably written in the area 101 of the storage 10, besides the information concerning the upper limit values in Parts A and B of the Table 4 schedule, as described previously. The purpose of such extra writing will be better understood as the description of the embodiment proceeds.

For the purpose of a usual registering operation in the cash register, a register mode key RG is depressed, so that the flip-flop FF is reset to keep the control CTL enabled in a register mode. In a registering operation, a commodity code is entered by means of a commodity code key CC and a unit price of the commodity is entered by means of a set of numeral keys NM. The commodity code as entered enables through a line AM the address generator AG to generate an address signal corresponding to a location for the said commodity in an area 102 of the storage 10. The address signal thus generated is loaded in response to a control signal a and enables in response to a control signal b the addressing circuit AS to address the said location in the area 102 of the storage 10. On the other hand the unit price, as entered enables the control CTL and thus the data generator DG to generate a corresponding data in a format suitable for data processing in the system. The data thus generated is loaded in the data register DR. Then a control signal f is produced to enable a gate G4, so that the data of the unit price loaded in the register DR is transferred through the gate G4 to a register BR. Then a control signal g is obtained to enable a gate G5, so that a cumulative amount of sales of the said commodity as stored in the corresponding location as addressed, as described above, is read and is loaded in the data register DR. Then a control signal h is produced to enable a gate G6, so that operation is carried out in an operating circuit OP to provide a sum of the cumulative amount of the sales of the said commodity loaded in the register DR and the unit price of the commodity loaded in the register BR and this is again loaded in the data register DR. Then a control signal c is produced to enable the gate G3, so that the said sum or a renewed cumulative amount of the sales is written in the corresponding location of the area 102 of the storage 10 as addressed, as described above.

Then a control signal d is produced to enable the address generator AG to generate an address signal for a location of a taxable sales amount area 103, in which the taxable amount of the sales for each purchaser in each purchase is cumulatively stored. The address signal thus generated is loaded, in response to the control signal a, in the address register AR and enables, in response to the control signal b, the addressing circuit AS to address the said location of the taxable sales amount area 103. Then a control signal g is produced to enable the gate G5, so that the taxable amount of the sales by a particular purchaser, as so far entered, is read out and loaded in the data register DR. It is recalled that in the description made in the preceding paragraph, the unit price as last entered remains loaded in the register BR. Then again a control signal h is produced to enable the gate G6, so that a sum of the last entered unit price and the cumulative taxable sales amount read from the area 103 of the storage 10 is again loaded in the data register DR. Then a control signal c is produced to enable the gate G3, so that the said sum or a renewed cumulative taxable sales amount is written in the area 103 of the storage 10. If two or more of the same commodities are purchased, the same operation is repeated. If different commodities are purchased, a similar operation is carried out with respect to a different location of the area 102 of the storage 10. More specifically, as the registering operation is repeated, a cumulative amount of the sales is written in the same location in the area 102 for each commodity and throughout a plurality of different purchasers, while a cumulative amount of the sales is written in the area 103 for each purchaser for covering a plurality of different commodities.

At the end of the registering operation for one purchaser, the tax operation in accordance with the present invention is carried out. For the purpose of the inventive tax operation mode a tax operation mode key TX is depressed, so that the control CTL is placed in a tax operation mode. First a control signal d is produced to enable the address generator AG to generate the address signal for the location of taxable sales amount area 103. Then a control signal a is produced so that the address signal thus generated is loaded in the register AR and, in response to a control signal b, enables the addressing circuit AS to address the said location of the area 103. Then a control signal g is produced so that the taxable amount of the sales is read out and loaded in the data register DR. A control signal i is then produced to enable the gate G7, so that the taxable amount of sales TXBL as read out is made input to a compare circuit 13 and operation circuits 15 and 16. Similarly a control signal j is produced to enable the address generator AG and a gate G8 so that the location in the area 101 where the maximum upper limit value of Part A, $A_m$, is stored is read out and the read value $A_m$ is supplied to an adder 14 and the operation circuit 16. Then a control signal k is produced to enable the address register AR and a gate G9, so that the location in the area 101 where the full cycle of the repeated pattern of the upper limit values in Part B, $B_m$, is stored is read out and the read value $B_m$ is supplied to the adder 14, and the operation circuits 15 and 16. A further control signal $l$ is produced to enable the address register AR and a gate G10, so that the location in the area 101 where the full cycle of imposable tax in Part B, $X_B$, is stored is read out and the read value $X_B$ is supplied to the operation circuit 16. In the adder 14, addition of the values $A_m$ and $B_m$ is carried out and the sum $A_m + B_m$ is supplied to the compare circuit 13. The compare circuit 13 compares the said sum $A_m + B_m$ and the taxable amount of sales TXBL.

Assuming that the taxable amount of sale TXBL exceeds the said sum of $A_m + B_m$, i.e. TXBL>$A_m + B_m$, as shown in the step S1 in the FIG. 2 flow chart, then a high output is obtained from the compare circuit 13 to enable the operation circuits 15 and 16 and to disable an operation circuit 19 through an inverter 18. The operation circuit 15 is supplied with the values $A_m$, $B_m$ and TXBL and is so adapted to perform the operation of SA = MOD(TXBL − $A_m/B_m$) + $A_m$, as shown in the step S2 in the FIG. 2 flow chart. The resultant ouput from the circuit 15 is supplied to a search circuit 21 through an OR gate 22, whereby the nearest larger upper limit value of the value SA is searched for, in Parts A and B of the Table 4 schedule as stored in the area 101 of the storage 10 and accordingly the corresponding tax value is obtained by means of an operation circuit 17. Although no list of the tax value has been stored in the area 101, the corresponding tax value is readily obtained based on the said nearest larger upper limit value, in view of the fact that in almost all the sales tax collection schedules the tax column is listed in an increasing order at an interval of one cent, as pointed out previously. The tax value corresponding to the said nearest larger upper limit value, thus obtained by the operation circuit 17, is applied to an adder 20. The operation circuit 16 is supplied, as inputs thereto, with the values $A_m$, $B_m$, XB and TXBL and is so adapted to perform the operations of TX = FLOOR (TXBL $A_m/B_m$)*$X_B$, as shown in the step S3 in the FIG. 2 flow chart. The resultant output from the circuit 16 is supplied to the adder 20. The adder 20 performs an addition of the said values of SA and TX to provide the desired value of the imposable retail sales tax. The tax thus obtained is displayed by the display 11 and printed out by the printer 12.

Next let it be assumed that the taxable amount of sales TXBL does not execeed the said sum of $A_m + B_m$, i.e. TXBL $\leq A_m + B_m$. Then a low output is obtained from the compare circuit 13 to disable the operation circuits 15 and 16 and to enable the operation circuit 19 through the inverter 18. The operation circuit 19 is supplied with only the value TXBL, which is further applied through the OR gate 22 to the search circuit 21, so that again the nearest larger upper limit value of the value TXBL is searched for in Parts A and B of the Table 4 schedule, as stored in the area 101 of the storage 10, and the corresponding tax value is obtained by means of the operation circuit 17. Since the operation circuit 16 has been disabled, no output therefrom is applied to the adder 20. Therefore only the tax value thus obtained by the preparation circuit 17 is produced as an output from the adder 20 and displayed and printed out, as described previously.

In the abovementioned embodiment several extra values such as the full cycle of the repeated pattern of the upper limit values in Part B, $B_m$ and the full cycle of imposable tax in Part B, $X_B$, were written in the area 101 of the storage 10, besides the information concerning the upper limit values in Parts A and B of the Table 4 schedule. Alternatively, however, these values $B_m$ and $X_B$ may be calculated in the system, using rather simple hardware for making the calculation of $B_m = B_M − A_m$, and for performing the count of the number of rows in Part B, in view of the fact that in almost all the sales tax collection schedules the tax column is listed in an increased order at an interval of one cent, as pointed out previously.

With particular reference to the Table 3 schedule for the state of Georgia, in certain portions in the tax column the tax increases at an interval of two cents. In order to eliminate an inconvenience which might be caused by this irregularity, the upper limit values such as 35 cents, one dollar and 35 cents, two dollars and 35 cents, etc. may be written twice in presetting the upper limit values of Parts A and B, whereby counting of the number of rows can provide the corresponding amount of the tax.

It is to be pointed out that in the foregoing description only the upper limit values in the respective ranges of the taxable amount of sales corresponding to the imposable sales tax amounts throughout Part A and the first cycle of Part B are stored in advance stored for the purpose of initial setting of the information or data concerning the Parts A and B of the sales tax collection schedule, so that the patterns of width of the range in each tax value throughout the Part A and the first cycle of Part B are initially stored. The reason is that a difference between the upper limit value in a certain row and that in a lower adjacent row constitutes a width of the range of the taxable amount of sales in the corresponding row or corresponding imposable sales tax amount. Therefore, this difference and thus the width of the range is readily obtained in the register from only the stored upper limits. Thus it is understood that it is not necessarily required to store both of the upper and lower limits of the range in the storage for the purpose of initial storing of the pattern of widths of the ranges in each tax value throughout the Parts A and B. It is apparent that alternatively of storing the upper limit values of the range only the lower limit values of the range may be stored in the storage.

While specific preferred embodiments of the present invention have been described, it will be apparent that obvious variations and modifications of the invention will occur to those skilled in the art from a consideration of the foregoing description. It is therefore desired that the present invention be limited only by the appended claims.

What is claimed is:

1. A system for calculating a sales tax imposed upon a total mount of sales based on a predetermined sales tax collection schedule in an electronic cash register which performs a registering operation and provides an electrical signal output representative of said taxable total amount of sales, and which schedule comprises a series of imposable tax values and respectively corresponding ranges of taxable sales amounts including therein a portion comprising a pattern of widths of successive said ranges for corresponding, successive said tax values, said system comprising storage means for storing said pattern of widths of successive said ranges and corresponding tax values throughout said portion of said collection schedule, means responsive to an output from said storage means and said electrical signal output of said register representative of said taxable total amount of sales for deducting the largest possible integral number of full cycles of the taxable amount of the repeatedly occurring pattern of said portion from said total amount of sales, means responsive to an output from said storage means and an output from said deducting means for determining a first imposable tax value corresponding to said total amount of sales, as deducted by said deducting means, means responsive to an output from said storage means and an output from said deducting means for multiplying the imposable tax amount for a full cycle of the repeatedly occurring pattern of said portion by said largest possible integral number for providing a second corresponding sales tax value imposable upon said deducted integral number of full cycles of taxable amount of the repeatedly occurring pattern of said first portion, and means responsive to an output from said determining means and an output from said multiplying means for adding said first and second imposable tax values for providing as an output the total amount of sales tax imposable upon said taxable total amount of sales.

2. A system in accordance with claim 1, in which said predetermined sales tax collection schedule further comprises a further, lower portion of said total amount of sales comprising a further pattern of widths of successive ranges for corresponding, successive tax values not occurring again in the remainder of the schedule, and said storage means stores said further pattern of widths of said ranges and corresponding tax values throughout said further portion of said schedule.

3. An electronic cash register in accordance with claim 1, in which said deducting means comprises:

means for comparing said taxable total amount of sales with the highest value of the range of values for each cycle of the pattern thereby to determine the said largest possible integral number of full cycles, means for determining the remainder from the taxable total amount of sales of the highest value of the range in said first portion, and means for determining a further remainder from said remainder of the highest value of said range corresponding to the highest tax value of said further portion.

4. A system in accordance with claim 1, in which said pattern of widths of successive ranges and respectively corresponding tax values throughout said portion of said collection schedule as stored in said storage means comprises a pattern of the upper sales amount value of each said successive range for each corresponding tax value.

5. A system in accordance with claim 1, in which said pattern of widths of successive said ranges and respectively corresponding tax values throughout said portion of said collection schedule as stored in said storage means comprises a pattern of the lower sales amount value of each said successive range for each corresponding tax value.

6. An electronic cash register in accordance with claim 1, in which said deducting means comprises:

means for comparing said taxable total amount of sales with the highest value of the range of values for each cycle of the pattern thereby to determine the said largest possible integral number of full cycles, and means for determining the remainder from said taxable total amount of sales of the highest value of said sales corresponding to said largest possible integral number of full cycles.

7. A method for calculating a sales tax imposed upon a total mount of sales based on a predetermined sales tax collection schedule in an electronic cash register which performs a registering operation and provides an electrical signal output representative of said taxable total amount of sales, and which schedule comprises a series of imposable tax values and respectively corresponding ranges of taxable sales amounts including therein a portion comprising a pattern of widths of successive said ranges for corresponding, successive said tax values, said method comprising the steps of storing said pattern of widths of said successive ranges and respectively corresponding tax values throughout said portion of said collection schedule, deducting from said total amount of sales the largest possible integral number of full cycles of the taxable amount of the repeatedly occurring pattern of said portion, as stored, indexing a first imposable tax corresponding to said total amount of sales, as deducted, by referring to said stored pattern of said widths of said ranges for the corresponding tax values throughout said portion of repeatedly occurring patterns of said collection schedule, multiplying the imposable tax amount for a full cycle of the repeated pattern of said portion by said largest possible integral number of full cycles of the repeated pattern for providing a second corresponding sales tax imposable upon said integral number of full cycles of the taxable amount for the repeated pattern in said portion, and adding said first and second imposable tax amounts for providing as an output the total amount of sales tax imposed upon said taxable total amount of sales.

8. A method in accordance with claim 7, in which said predetermined sales tax collection schedule further comprises a further, lower portion of said total amount of sales comprising a further pattern of widths of successive ranges for corresponding, successive tax values not occurring again in the remainder of the schedule, and said storing step further comprises the step of storing said further pattern of widths of said ranges and corresponding tax values throughout said further portion of said schedule.

9. A method in accordance with claim 7, in which said pattern of widths of successive ranges and respectively corresponding tax values through said portion of said collection schedule as stored in said storage means comprises a pattern of the upper sales amount value of each said successive range for each corresponding tax value.

10. A method in accordance with claim 7, in which said pattern of widths of successive said ranges and respectively corresponding tax values throughout said portion of said collection schedule as stored in said storage means comprises a pattern of the lower sales amount value of each said successive range for each corresponding tax value.

11. A method in accordance with claim 7, in which said deducting step comprises:
comparing said taxable total amount of sales with the highest value of the range of values for each cycle of the pattern thereby to determine the said largest possible integral number of full cycles, and
determining the remainder from said taxable total amount of sales of the highest value of said sales corresponding to said largest possible integral number of full cycles.

12. A method in accordance with claim 7, in which said deducting step comprises:
comparing said taxable total amount of sales with the highest value of the range of values for each cycle of the pattern thereby to determine the said largest possible integral number of full cycles,
determining the remainder from the taxable total amount of sales of the highest value of the range in said first portion, and
determining a further remainder from said remainder of the highest value of said range corresponding to the highest tax value of said further portion.

13. An electronic cash register for performing a registering operation for providing a total amount of sales and for calculating a sales tax imposed upon said total amount of sales based upon a predetermined sales tax collection schedule which comprises a series of imposable tax values for respectively corresponding ranges of the taxable sales amounts and includes therein a portion comprising a pattern of widths of successive said ranges for successively increasing, respectively corresponding tax values occurring repeatedly in successive cycles and in a regular fashion for increasing tax values, said electronic cash register comprising:
keying input means for manual entry of numerical information,
means for manually selecting an operation mode of said cash register, said cash register having a schedule information entering mode, a registering mode, and an imposable sales tax calculating mode,
storage means having locations for storing at least data concerning said pattern of widths of said successive ranges and the respectively corresponding tax values thereof, throughout said portion of said collection schedule,
means responsive to an output from said operation mode selecting means representative of the selection of said schedule information entering mode and an output from said keying input means representative of said data to be stored, in accordance with manual entry on said keying input means of that data as numerical information, for storing said data in said storage means,
means responsive to an output from said operation mode selection means representative of the selection of said registering mode and an output from said keying input means representative of an amount of sales for each commodity, in accordance with manual entry of the amount of sales on said keying input means as numerical information, for calculating said total amount of sales,
means responsive to an output from said operation mode selection means representative of selection of said imposable sales tax calculating mode, for reading said data from said storage means,
means responsive to an output from said means for calculating said total amount of sales and an output from said means for reading said data, for calculating said sales tax imposed on said total amount of sales, based on said predetermined sales tax collection schedule, said sales tax calculating means comprising
means responsive to an output from said storage means and the output representative of said total amount of sales for deducting the largest possible integral number of full cycles of the taxable amount of the repeatedly occurring pattern of said portion from said total amount of sales,
means responsive to an output from said storage means and an output from said deducting means for determining a first imposable tax corresponding to the remainder of said total amount of sales after said deducting therefrom by said deducting means,
means responsive to an output from said storage means and an output from said deducting means for multiplying the imposable tax amount for a full cycle of the repeated pattern of said portion by said largest possible integer number of full cycles of the repeated pattern for providing a second corresponding sales tax imposable upon said integer number of full cycles of the taxable amount for the repeated pattern in said portion, and
means responsive to an output from said determining means and an output from said multiplying means for adding said first and second imposable tax amounts and providing as an output the total amount of sales tax imposed upon said taxable total amount of sales.

14. An electronic cash register in accordance with claim 13, in which said deducting means comprises:
means for comparing said taxable total amount of sales with the highest value of the range of values for each cycle of the pattern thereby to determine the said largest possible integral number of full cycles, and
means for determining the remainder from said taxable total amount of sales corresponding to said largest possible integral number of full cycles.

15. An electronic cash register in accordance with claim 13, in which
said predetermined sales tax collection schedule further comprises a further, lower portion of said total amount of sales comprising a further pattern of widths of successive ranges for corresponding, successive tax values not occurring again in the remainder of the schedule, and
said storage means stores said further pattern of widths of said ranges and corresponding tax values throughout said further portion of said schedule.

16. An electronic cash register in accordance with claim 15, in which said deducting means comprises:
means for comparing said taxable total amount of sales with the highest value of the range of values for each cycle of the pattern thereby to determine the said largest possible integral number of full cycles, means for determining the remainder from the taxable total amount of sales of the highest value of the range in said first portion, and means for determining a further remainder from said remainder of the highest value of said range corresponding to the highest tax value of said further portion.

17. An electronic cash register in accordance with claim 13, in which said data concerning said pattern of widths of successive ranges and respectively corresponding tax values throughout said portion of said collection schedule as stored in said storage means comprises a pattern of the upper sales amount value of each said successive range for each corresponding tax value.

18. An electronic cash register in accordance with claim 13, in which said data concerning said pattern of widths of successive said ranges and respectively corresponding tax values throughout said portion of said collection schedule as stored in said storage means comprises a pattern of the lower sales amount value of each said successive range for corresponding tax value.

19. An electronic cash register in accordance with claim 13, which further comprises:

means for generating address signals, and means responsive to said address signals for addressing locations in said storage means for storing data concerning said pattern of widths of said successive ranges and respectively corresponding tax values, throughout said portion of said collection schedule.

20. An electronic cash register in accordance with claim 19, in which said means for writing in said storage means comprises means for manually advancing said locations in said storage means, and said address signal generating means comprises means responsive to an output from said means manually advancing said locations, for advancing said address signals generated by said address signal generating means.

21. An electronic cash register in accordance with claim 20, in which said means for calculating said total amount of sales comprises means for calculating a total amount of sales for each commodity, and said storage means further comprises locations for storing said total amount of sales for each commodity.

22. An electronic cash register in accordance with claim 21, in which said cash register further has a commodity code entering operation mode, and said means for calculating a total amount of sales for each commodity comprises means for manually selecting said commodity code entering operation mode.

23. An electronic cash register in accordance with claim 22, in which said storage means further comprises locations for storing said total amount of sales.

* * * * *

UNITED STATES PATENT AND TRADEMARK OFFICE
CERTIFICATE OF CORRECTION

PATENT NO. : 3,946,217
DATED : March 23, 1976
INVENTOR(S) : Atsushi Tsujikawa; Yoshio Morimoto It is certified that error appears in the above-identified patent and that said Letters Patent are hereby corrected as shown below:

Column 5, line 53, after "ranges," insert --i.e.--.

Column 6, line 66, "$a_n = A_{n+2} - A_n (n=0, 1,)$" should be --$a_n = A_{n+2} - A_n (n = 0, 1, ...)$--.

Column 12, line 4, "preparation" should be --operation--.

$\mathfrak{Signed}$ and $\mathfrak{Sealed}$ this

*fifteenth* $\mathfrak{Day}$ of *June 1976*

[SEAL]

*Attest:*

RUTH C. MASON
*Attesting Officer*

C. MARSHALL DANN
*Commissioner of Patents and Trademarks*